A. DI MARIO.
CAR REPLACER.
APPLICATION FILED FEB. 10, 1919.

1,316,879.

Patented Sept. 23, 1919.
2 SHEETS—SHEET 1.

INVENTOR
Alberto Di Mario
BY
ATTORNEY

A. DI MARIO.
CAR REPLACER.
APPLICATION FILED FEB. 10, 1919.

1,316,879.  Patented Sept. 23, 1919.
2 SHEETS—SHEET 2.

INVENTOR
Alberto Di Mario.
BY
ATTORNEY

UNITED STATES PATENT OFFICE.

ALBERTO DI MARIO, OF BANNOCK, OHIO.

CAR-REPLACER.

1,316,879. Specification of Letters Patent. Patented Sept. 23, 1919.

Application filed February 10, 1919. Serial No. 275,969.

*To all whom it may concern:*

Be it known that I, ALBERTO DI MARIO, a subject of the King of Italy, and resident of Bannock, county of Belmont, and State of Ohio, have invented certain new and useful Improvements in Car-Replacers, of which the following is a specification.

This invention relates broadly to shifting mechanisms, and more specifically to a shiftable lifting jack.

The primary object of the invention is to provide a lifting jack having associated therewith mechanism whereby its location may be readily shifted for transporting laterally a load sustained thereby.

A further object is to provide a device, designed primarily as a car-replacer, whereby an end of a car may be elevated and whereby, when in elevated position, such car may be shifted laterally, as for replacing a derailed car on the track.

With these and other objects in view, the invention resides in the features of construction, arrangement of parts and combinations of elements which will hereinafter be described, reference being had to the accompanying drawings, in which—

Referring to said drawings, in which like designating characters distinguish like parts throughout the several views—

1 indicates generally a lifting jack which may have any preferred character or form of lifting mechanism embodying a vertically movable standard 2. In the more or less conventional type of jack shown herein for illustrative purposes, the standard 2 has its upper end provided with a head-like rest 3 and also carries adjacent to its lower end a forwardly extending foot-like rest 4. Either of said rests may be employed, as may be found most convenient in individual cases.

Figure 8:
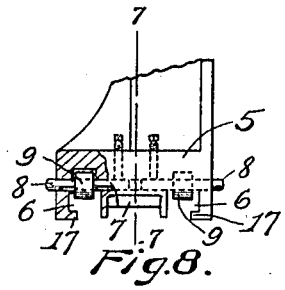
Fig. 8 is a view of the base portion of the jack, partly in transverse section and partly in end elevation; and—
Figure 9:
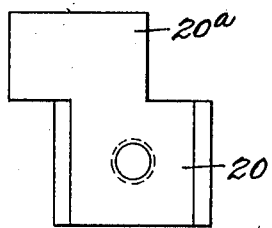
Figs. 9 and 10 are, respectively, inner face and upper edge views of the removable lug provided at the jack-entering end of the jack-support.
Figure 10:

The base 5 of the jack has a novel construction, being substantially rectangular in form and having its greatest dimensions lying in a direction transverse to the face of the jack. Provided in the under face of said base are two longitudinally extending parallel channels 6 which are separated by an intermediate toothed rack 7. Rotatably mounted upon transversely disposed spindles 8 mounted in the base 5 adjacent to each end of each channel 6 is an anti-friction roller 9 which has the lowermost peripheral portion protruding within the upper portion of the adjacent channel, as is best shown in Fig. 8.

Figure 1:
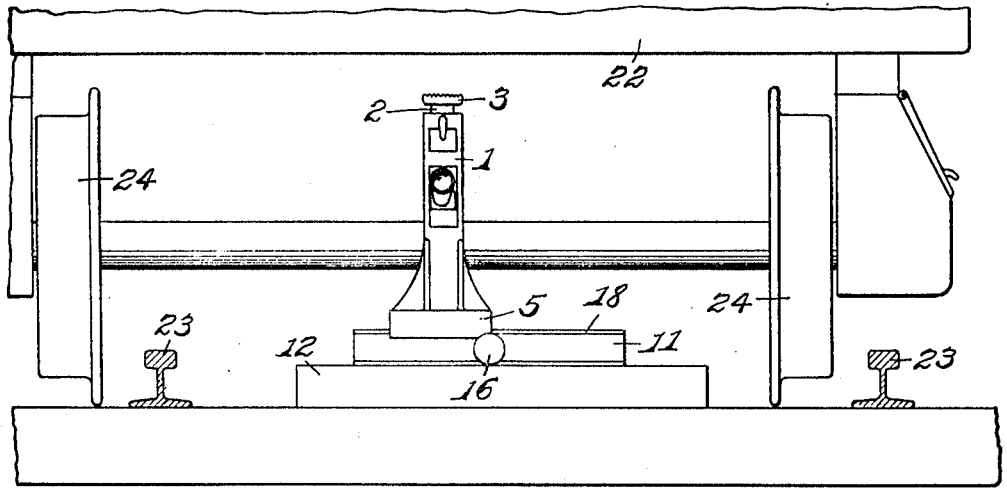
Figure 1 is a front elevation of the invention, illustrating its use as a car-replacer.
Figure 2:
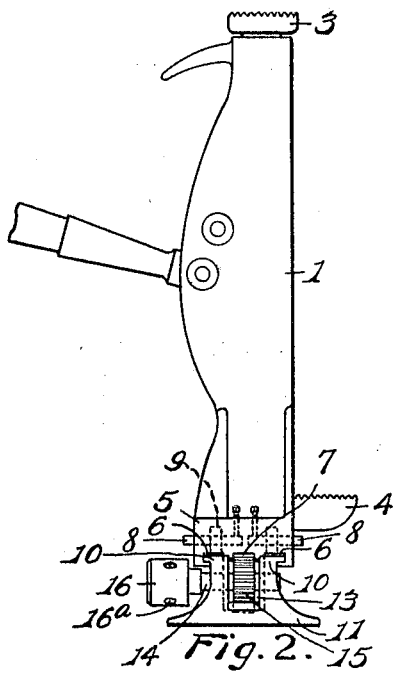
Figs. 2 and 3 are, respectively, enlarged side and front elevations of the invention.
Figure 3:
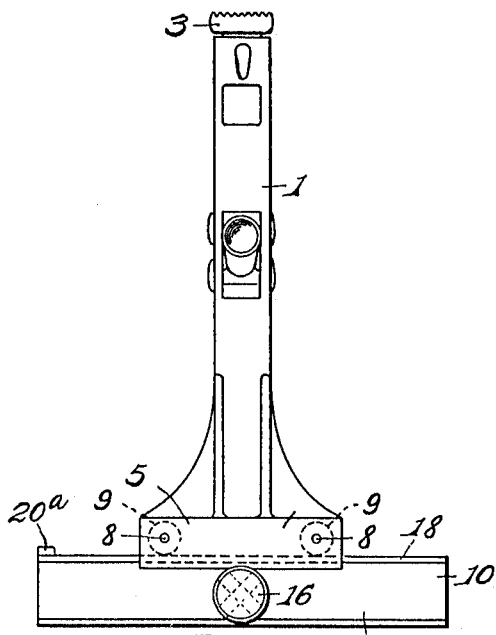
Figure 4:
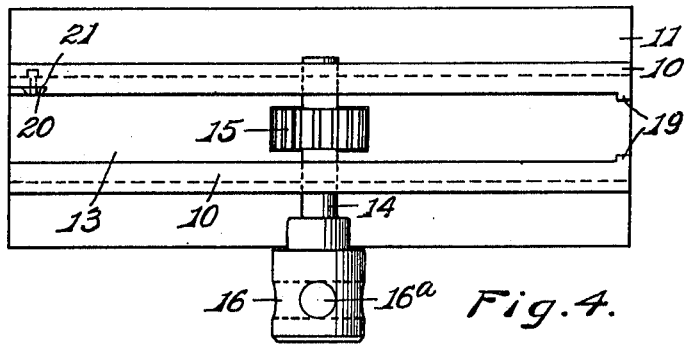
Fig. 4 is an enlarged top plan view of the track-like support on which the jack is mounted.
Figure 5:
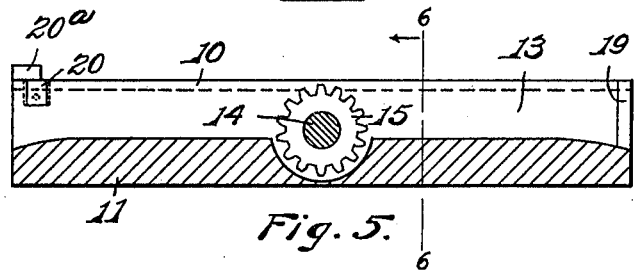
Fig. 5 is a longitudinal section of the same, taken on line 5—5, Fig. 6.
Figure 6:
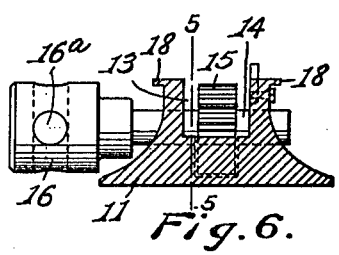
Fig. 6 is a cross section on line 6—6, Fig. 5.
Figure 7:
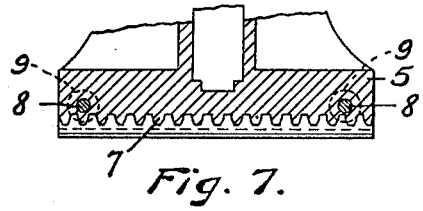
Fig. 7 is an enlarged vertical section of the base portion of the jack, taken on line 7—7, Fig. 8.

The channels 6 are designed to receive therein the upper portions of two parallel trackways 10 formed on or carried by a supporting member 11 which has a broad flat base or under portion for resting upon the ground, a crosstie, or other suitable foundation, as the length or block 12 of timber shown in Fig. 1. When the jack is disposed upon the support 11 with the trackways 10 of the latter received within the channels 6 of the former, the rollers 9 rest upon and are freely rotatable along said trackways, supporting said jack and the weight of any load placed upon the jack.

Mounted upon a transversely disposed rotatable shaft 14 and located substantially midway between the ends of the support 11 within a channel 13 provided intermediate the trackways 10 is a spur gear 15 which meshes with the teeth of the rack 7. Carried by a projecting end of said shaft 14 is a cylindrical head 16 provided with radially disposed sockets 16ª adapted for the reception of an end of a suitable rod or bar which may be employed as a lever for effecting rotation of the gear.

A reëntrant flange 17 carried by the jack base 5 at the outer side of each channel 6 interlocks with a lateral outwardly extending flange 18 carried by each trackway 10 adjacent to the upper surface of the latter, said flanges serving to maintain the jack in upright position on the support 11.

The support 11 has its channel 13 reduced in width at one end, or provided with inwardly directed buffers 19 adapted to be abutted by an end of the jack-base for stopping the travel of the latter, preventing it from passing off said end of the support. The opposite end of said support is preferably provided with detachable means whereby chance passage of the jack from said end is prevented, the means herein shown consisting of a dove-tail plate 20 adapted to seat in a similarly shaped recess 21 provided in the end of one of the trackways 10, said plate having a head 20$^a$ adapted to project above the surface of said trackway in a position to be engaged by and to arrest movement of the jack when traveling in that direction.

In practice, assuming that a car, as 22, occupies the derailed position shown in Fig. 1, the jack is mounted upon its support 11 which is in turn mounted upon a suitable foundation, as the block 12, located intermediate opposite wheels of the car. Having elevated the end of the car on the jack to the appropriate height, the jack is caused to travel laterally along the support 11 until the wheels 24 of the car overhang the track rails 23, whereupon the standard 2 of the jack is lowered to seat said wheels on said rails.

From the foregoing description it will be understood that I provide a simple and convenient tool whereby derailed cars may be easily and quickly replaced upon the track. It will be understood, also, that the device is readily applicable to various other uses where heavyweights are to be moved or shifted throughout short distances, and that it is not, therefore, limited to the specific use exemplified.

What is claimed is:—

1. A tool of the character described comprising a lifting jack having parallel channels formed in the under side of the base thereof, reëntrant flanges formed on the outer walls of said base and extending into said channels, a toothed rack carried parallel to and between said channels, a support having a channel extending lengthwise of the upper face thereof and having parallel trackways formed at opposite sides of said channel, a lateral flange formed on each trackway, said lateral flanges being interlocked with said reëntrant flanges, said support having said jack-base mounted thereon with the trackways received in the channels of said jack-base, anti-friction rollers carried by said jack-base protruding into the channels thereof and resting upon said trackways, and a spindle journaled in said base and having an end extended laterally from the latter, a pinion carried by said spindle located within the channel of said support and in operative relation to said toothed rack, and a head carried on the extended end of said spindle, said head having radial sockets therein.

2. A tool of the character described, comprising a single lifting jack having parallel channels formed in the under side of the base thereof, reëntrant flanges formed on the lateral walls of said base and extending into said channels, a toothed rack carried parallel to and between said channels, a support having a channel extending lengthwise of the upper face thereof and having parallel trackways formed in elevated positions at opposite sides of said channel, a lateral flange formed on each trackway, said lateral flanges being interlocked with said reëntrant flanges, said support having said jack-base mounted thereon with the trackways received in the channels of said jack-base, anti-friction rollers carried by said jack-base protruding into the channels thereof and resting upon said trackways, and a gear wheel disposed in the channel of said support and interengaged with said toothed rack, said gear having means extending laterally therefrom whereby rotation may be imparted thereto for actuating said jack through its rack to travel along said support.

In testimony whereof, I affix my signature in presence of two subscribing witnesses.

ALBERTO DI MARIO.

Witnesses:
ABRAMO GRINGIUCOMO,
JOE BESE.